July 28, 1953 W. D. KENNEDY 2,646,592
MEANS FOR FEEDING COLLAPSIBLE TUBULAR MEMBERS ONTO CORES
Filed March 19, 1949 2 Sheets-Sheet 1
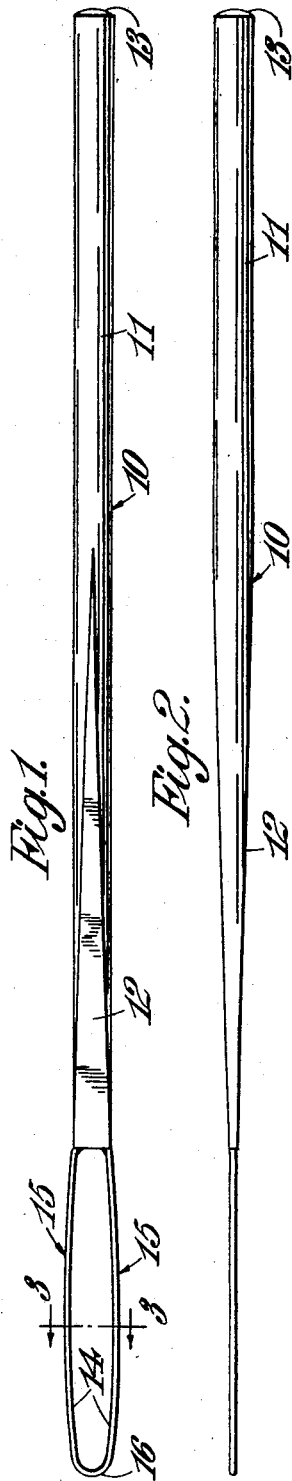
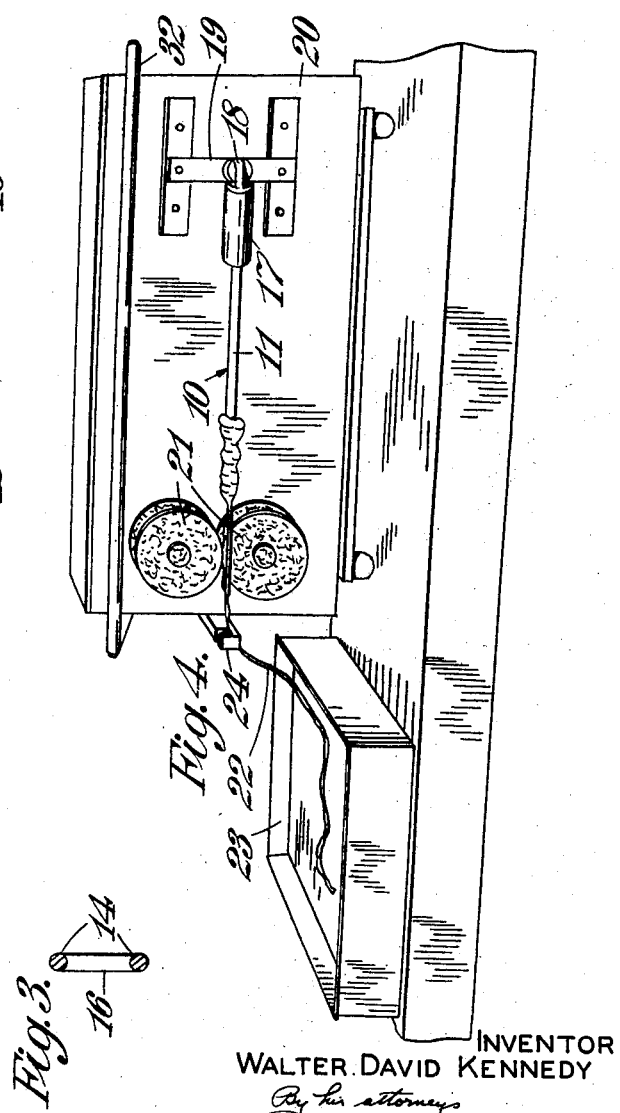
INVENTOR
WALTER. DAVID KENNEDY July 28, 1953 W. D. KENNEDY 2,646,592
MEANS FOR FEEDING COLLAPSIBLE TUBULAR MEMBERS ONTO CORES
Filed March 19, 1949 2 Sheets-Sheet 2
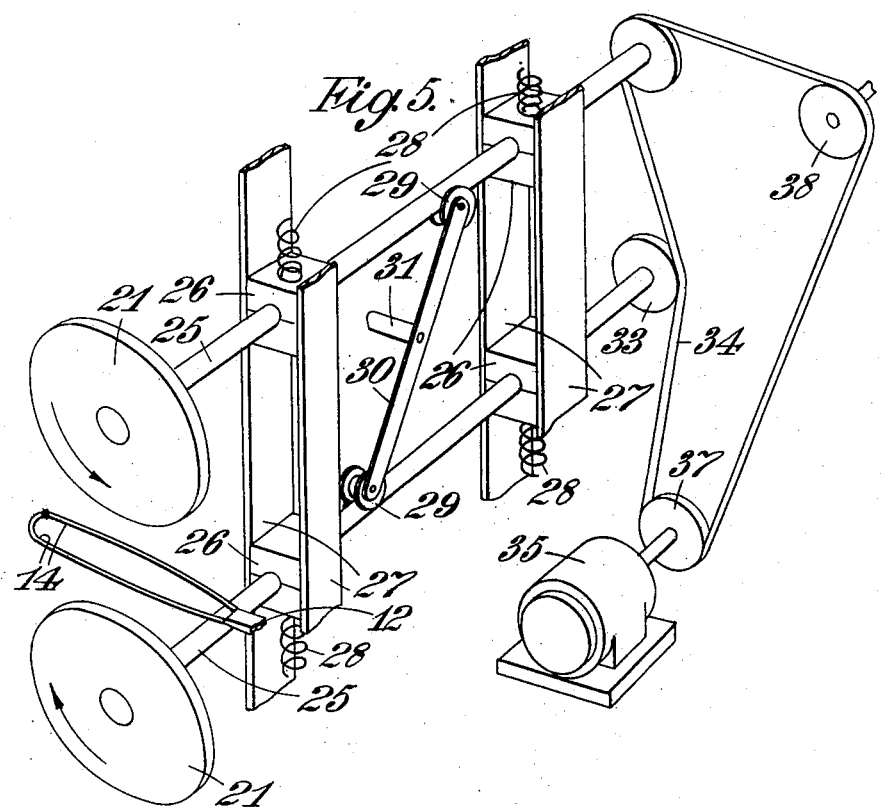
INVENTOR
WALTER DAVID KENNEDY

Patented July 28, 1953

2,646,592

UNITED STATES PATENT OFFICE 2,646,592

MEANS FOR FEEDING COLLAPSIBLE TUBULAR MEMBERS ONTO CORES

Walter David Kennedy, London, England

Application March 19, 1949, Serial No. 82,452
In Great Britain February 7, 1949

4 Claims. (Cl. 17—42)

This invention concerns means for feeding collapsible tubular members on to a core and has particular reference to feeding sausage casings on to a rod or stick. For convenience the specification will refer only to the latter use but, nevertheless, it is to be understood that the invention is not so limited.

In the manufacture of sausages it has been usual to feed the sausage casing on to a rod or stick and this operation may be performed manually. Due, however, to the friction between the casing and the stick this takes considerable time and effort.

When the casing is mounted on the stick the latter is placed in endwise engagement with the nozzle of a stuffing machine and the casing slid off the stick on to the nozzle.

This invention broadly has for its object to reduce the friction between a collapsible tubular member and a core when the former is fed over the latter.

More specifically the present invention has for its object to reduce the friction between a sausage casing and a transfer rod or stick so that the casing may be readily fed on to the rod. It is a further object of this invention to enable this operation to be performed mechanically.

According to the present invention apparatus for preparing a collapsible tubular member for transfer to a cylindrical receiver comprises a frame, a cylindrical core supported towards one end from the frame, said core comprising a pair of relatively long, thin elements lying side by side, spaced apart transversely of their length, substantially parallel and projecting from the other end of the core to its support, a pair of rollers, means for supporting the rollers from the frame, and means for driving the rollers, the arrangement being that the tubular member is adapted to be gripped between the pair of rollers and fed over the elements of the cylindrical core on to said core, the rollers engaging the tubular member between the elements to feed it over them.

The present invention also includes within its scope a rod for transferring sausage casings to the nozzle of a sausage stuffing machine, and, according to this feature of the invention, the rod comprises a pair of relatively long, thin elements which lie side by side, are spaced apart transversely of the elements and are substantially parallel, said elements projecting wholly beyond one end of the rod to which they are immovably secured, the thickness of the rod at the end thereof which carries said elements, in a direction normal to a plane containing the elements, being not greater than the thickness of the elements and progressively increasing to a substantially circular cross-section at a point intermediate the ends of the rod.

A practical application of the present invention will now be described, merely by way of example, with reference to the accompanying drawings whereof, Figure 1 is a plan view of a rod for transferring sausage casings to the nozzle of a stuffing machine in accordance with the present invention, Figure 2 is a side elevation of the rod of Figure 1, Figure 3 is a section on the line 3—3 of Figure 1 to an enlarged size, Figure 4 is a general perspective view showing apparatus for feeding a sausage casing on to the rod of Figure 1, and Figure 5 is a diagrammatic perspective view showing certain details of the apparatus of Figure 4.

Referring to Figures 1, 2 and 3; the transfer rod, which is generally indicated by the reference numeral 10, has a cylindrical body 11, one end of which is wedge-shaped as at 12. The sausage casings are adapted to be fed on to the rod 10 at the wedge-shaped end 12 and to pass over the body 11. When the end 13 is placed against the nozzle of a stuffing machine the casing will be transferred from the rod 10 to the nozzle by sliding the casings off the end 13 of the rod.

Projecting from the wedge-shaped end of the rod is a pair of spaced-apart elements 14. The elements preferably enter holes drilled in the wedge 12 and are welded or otherwise immovably secured thereto to project wholly beyond the end of the rod. As is clear from Figure 1 the elements are relatively long and thin and are substantially parallel and lie side by side. The free ends of the elements are joined together to form an outwardly-directed arch 16. The distance between the elements may be slightly greater than the diameter of the body 11, but the distance round the elements is less than the circumference of the casing. The elements 14 therefore form a "hairpin" projecting from the wedge 12 of the rod 10.

The thickness of the wedge portion 12 (i. e. in a direction normal to a plane containing the elements 14) increases progressively from the elements (where the thickness of the wedge is less than the thickness of the elements) to a point intermediate the ends of the rod at which intermediate point the body 11 is of circular cross-section. From said intermediate point to the end of the rod remote from the elements 14 the rod 11 is of constant diameter.

From Figure 2 it will be noted that a plane containing the elements 14 also contains the thin end of the wedge 12. Each element 14 is circular in cross-section as shown in Figure 3 but other sections may be used.

Referring now to Figure 4: the transfer rod 10 is received by a sleeve 17 which is pivoted at 18 to a bracket 19 carried by a frame 20. The rod 10 lies horizontally and may be readily removed from the sleeve 17 and replaced.

The frame 20 carries a pair of cork rollers 21 which are movable towards and away from each other and are adapted to touch between the elements 14 of the rod 10. The sausage casing 22 is drawn from a tray 23, passes over a guide 24, towards the elements 14 and is fed over the elements and on to the body 11 by the rollers 21.

To begin with a sausage casing is withdrawn over the arch 16 and along the elements 14 by hand and the casing which is stretched between the elements is then brought to between the rollers. The rollers are then brought together so as to engage the stretched casing between elements 14 and are suitably driven thereby feeding the casing over the elements and on to the body 11. Any increase of pressure between the rollers immediately increases their grip on the casing without increasing the frictional grip between casing and elements.

In Figure 5 there is diagrammatically shown the rollers 21 mounted on shafts 25 which are supported in bearing blocks 26. The bearing blocks are capable of moving towards and away from each other between the slides 27. The bearings 26 are engaged by springs 28 to press the shafts 25 towards each other. The shafts 25 ar engaged by rollers 29 carried by a pivotal arm 30 which is rotatable by the shaft 31 so as to separate the shafts. The shaft 31 is turned by a handle 32 (see Figure 4).

Each of shafts 25 carries a pulley 33 over which passes a belt 34 which is driven from an electric motor 35 by a pulley 37. To allow for the movement of the shafts 25 towards and away from one another the belt 34 passes over a jockey pulley 38.

With the arrangement described the handle 32 is normally held in a position such that the rollers 21 are held apart. When the casing has been drawn over the fingers 14 as above described and the rod has been mounted in the sleeve 17 and brought to between rollers 21 the handle 32 is adjusted to allow rollers 21 to be moved towards each other by the springs 28. When the motor 35 drives the roller 21 the casing will be fed on to the rod.

The transfer rod is preferably made from stainless steel but it will be appreciated that other materials may be used. Where the material of the transfer rod is liable to corrosion it may be plated or otherwise treated.

I claim:

1. Apparatus for preparing a collapsible tubular member for transfer to a cylindrical receiver comprising a frame, a cylindrical core supported towards one end from the frame, said core comprising a pair of relatively long, thin elements lying side by side, spaced apart transversely of their length, substantially parallel and projecting from the other end of the core to its support, a pair of rollers, supporting means on the frame carrying the rollers and driving means connected to said rollers rotating said rollers in opposite directions, said rollers being supported from the frame so as to grip the tubular member between the pair of rollers and feed it over the elements of the cylindrical core on to said core, said rollers engaging the tubular member between the elements to feed it over them.

2. Apparatus for preparing a sausage casing for transfer to a stuffing machine comprising a frame, a transfer rod supported towards one end from the frame, said rod comprising a pair of relatively long, thin elements lying side by side, spaced apart transversely of their length, substantially parallel and projecting from the other end of the rod to its support, a pair of rollers, supporting means on the frame carrying the rollers and driving means connected to said rollers rotating said rollers in opposite directions, said rollers being supported on the frame so as to grip the tubular member between the peripheries of the pair of rollers and feed it over the elements of the transfer rod and on to the rod, said rollers engaging the sausage casing between the elements to feed it over them.

3. Apparatus for preparing a sausage casing for transfer to a stuffing machine comprising a frame, a transfer rod supported towards one end from the frame, said rod comprising a pair of relatively long, thin elements lying side by side, spaced apart transversely of their length, substantially parallel and projecting from the other end of the rod to its support, a pair of rollers, supporting means on the frame carrying the rollers, resilient means pressing the peripheries of the rollers toward each other and driving means connected to said rollers rotating said rollers in opposite directions, said rollers being supported on the frame so as to grip the tubular member between the peripheries of the pair of rollers and feed it over the elements of the transfer rod and on to the rod, said rollers engaging the sausage casing between the elements to feed it over them.

4. Apparatus for preparing a sausage casing for transfer to a stuffing machine comprising a frame, a transfer rod supported towards one end from the frame, said rod comprising a pair of relatively long, thin elements lying side by side, spaced apart transversely of their length, substantially parallel and projecting from the other end of the rod to its support, a pair of rollers, a shaft on which each roller is mounted, a bearing to support each shaft, a bearing mounting in the frame allowing the shafts to move towards and away from each other to vary the distance between the rollers, resilient means on the bearing mounting urging the bearing mountings toward each other and driving means connected to the shafts rotating said shafts and thereby the rollers in opposite directions, said rollers being supported on the frame so as to grip the tubular member between the peripheries of the pair of rollers and feed it over the elements of the transfer rod and on to the rod, said rollers engaging the sausage casing between the elements to feed it over them.

WALTER DAVID KENNEDY.

(References on following page)

References Cited in the file of this patent

UNITED STATES PATENTS

| Number | Name | Date |
|---|---|---|
| D. 31,349 | Lewald | Aug. 8, 1899 |
| 208,858 | Smith | Oct. 8, 1878 |
| 744,712 | Bitterling | Nov. 24, 1903 |
| 1,059,411 | Unversaw et al. | Apr. 22, 1913 |
| 1,222,318 | Miller | Apr. 10, 1917 |
| 1,523,465 | Villemer | Jan. 20, 1925 |
| 1,616,971 | Henderson | Feb. 8, 1927 |
| 1,627,611 | Lundquist | May 10, 1927 |
| 1,881,835 | Mitchell | Oct. 11, 1932 |
| 2,010,626 | Dietrich | Aug. 6, 1935 |
| 2,042,403 | Hrivnak | May 26, 1936 |
| 2,148,550 | Haase | Feb. 28, 1939 |
| 2,157,593 | Conklin | May 9, 1939 |
| 2,244,560 | Leavenworth | June 3, 1941 |
| 2,595,638 | Castelow | May 6, 1952 |